Feb. 20, 1923.
A. A. MATHESON.
ALLIGATOR LUG PICKER.
FILED JULY 18, 1921.
1,445,969.
2 SHEETS—SHEET 2.
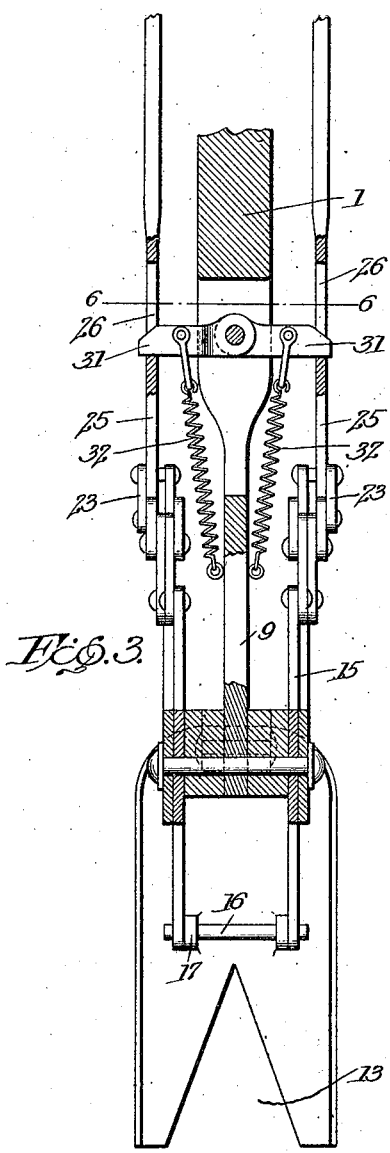
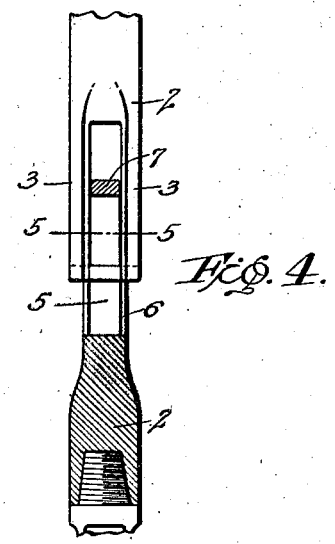
Fig. 4.
Fig. 5.
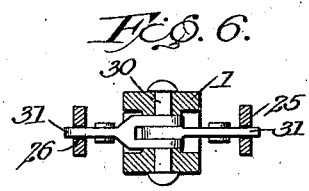
Fig. 6.
Andrew A. Matheson
INVENTOR
BY Victor J. Evans
ATTORNEY
WITNESS:

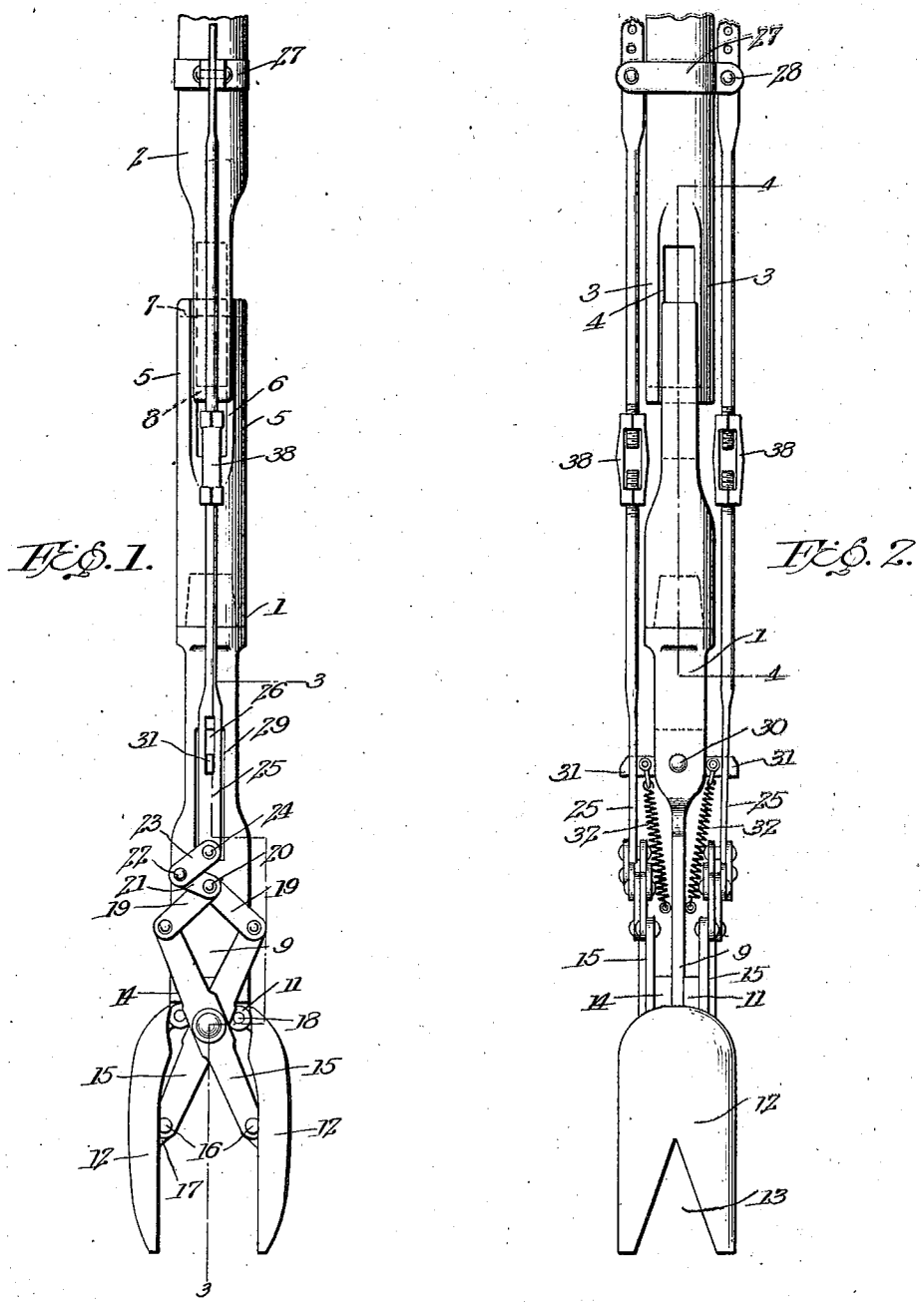

Patented Feb. 20, 1923.

1,445,969

UNITED STATES PATENT OFFICE.

ANDREW A. MATHESON, OF SHOSHONI, WYOMING, ASSIGNOR TO WYOMING TOOL COMPANY, INC., OF SHOSHONI, WYOMING, A CORPORATION OF WYOMING.

ALLIGATOR LUG PICKER.

Application filed July 18, 1921. Serial No. 485,627.

*To all whom it may concern:*

Be it known that I, ANDREW A. MATHESON, a citizen of the United States, residing at Shoshoni, in the county of Fremont and State of Wyoming, have invented new and useful Improvements in Alligator Lug Pickers, of which the following is a specification.

My present invention has reference to a fishing tool for use in oil or other wells for recovering lugs, parts of machinery, etc. which may have fallen through the well casing.

My object is to produce a device of this character constituting a shank having jaws on the lower end thereof, said jaws being held in open position when the device is passed into the well casing and designed to automatically close to grip an article therebetween when brought into contact with the lower surface of the well to permit of such article being fished out of the well.

A further object is to produce a fishing tool constituting a vertically suspended shank whose lower portion comprises two slidably associated sections, the lower section having jaws pivotally associated therewith, means being provided for swinging the jaws to either open or closed position, said means including slotted rods which are secured to the upper section and which are designed to be drawn thereby, when the upper section is moved away from the lower section, to force the jaws to closed position, but which, however, are normally engaged by holding means that prevent the outward movement of the upper section on the lower section and hold the jaws in open position when the device is passed through the well casing, said holding means, however, being released when the jaws are brought to contacting engagement with the lower wall of the well.

The foregoing, and other objects which will appear as the nature of the invention is better understood, may be accomplished by a construction, combination and operative association of parts, such as is disclosed by the drawings which accompany and which form part of this application.

In the drawings:—

Figure 1 is a side elevation of the improvement.

Figure 2 is a view taken at right angles to Figure 1.

Figure 3 is a sectional view on the line 3—3 of Figure 1, on an enlarged scale.

Figure 4 is a sectional view on the line 4—4 of Figure 2.

Figure 5 is a sectional view on the line 5—5 of Figure 4.

Figure 6 is a sectional view on the line 6—6 of Figure 3.

The improvement essentially comprises a shank that is made up of two slidably associated sections. As in practice, the shank is held in vertical position, I will refer to the section 1 as the lower section, and the section 2 as the upper section. The upper section has secured thereto suitable means whereby the device may be lowered in a well casing to remove lugs, parts of machinery or other obstacles that have been inadvertently dropped through the casing.

The upper section 2 has its lower end bifurcated, the arms 3 thus provided having their lower edges beveled inwardly, as at 4. The upper end of the lower section is likewise bifurcated, the arms 5 thus provided having their edges beveled inwardly, as at 6. The arms 3 of the section 2 are received between the arms 5 of the section 1, and the contacting engagement of the beveled surfaces of the arms provide means for holding the sections in longitudinal alignment, and also do not materially interfere with the rounded cross sectional contour of the shank sections, at the meeting ends thereof. The spaced arms 5 have their ends connected by an element 7 which passes between the arms 3. The arms have their outer ends connected by an element 8, which passes between the arms 5. These members being arranged transversely with respect to each other are designed to be brought into contacting engagement when the shank sections are spread away from each other.

The lower section 1, at the lower end thereof is flattened and widened, as at 9. To the lower corners of the said portion 19 there are pivoted as at 18, ears 11 provided in spaced pairs on the inner and upper faces of concaved alligator jaws 12. The outer ends of the jaws are centrally formed with V-shaped notches 13.

The sides of the end 9 of the shank section 1, have transversely arranged outwardly projected lugs or enlargements 14 to each of which is pivoted crossed levers 15, the said pairs of levers being pivoted, as at 16 respectively, to inwardly extending lugs or ears 17 on the respective jaws 12.

The outer ends of the respective pairs of crossed levers 15 have each pivoted thereto a link 19. The links 19 have their free ends disposed in lapping relation to each other and are pivotally connected, as at 20. The pivots 20 also secure to the links shorter links 21, the said shorter links being pivoted, as at 22 to additional links 23. These outer links are pivoted, as at 24 to bars 25. The bars are provided with elongated slots 26 and have their upper ends adjustably secured on the upper link section through the medium of opposed clips 27 which surround the said upper section 2 and have offset ends disposed on the opposite sides of the bars 25, the said ends being compressed by means 28 that pass therethrough and through the said bars.

The section 1 upward of its portion 9 is centrally provided with an elongated slot or opening 29. Pivoted, as at 30, in the slot or opening 29, adjacent to the upper end thereof are two dogs 31 respectively. These dogs 31 are normally retained in the slot or opening 29 through the medium of springs 32, but are designed to be brought into the slots 26 of the bars in contacting engagement with the lower wall provided by the said slots, when the jaws are in their open position and the section 1 is moved upwardly on the section 2. The weight of the upper section 2, in connection with the sustaining means therefor hold the dogs in what may be termed operative position, that is in engagement with the bars, retaining the said bars in a position to influence the links and lazy tong connection between the bars and jaws for holding the jaws in open position. The tool may be thus lowered in the casing with the jaws in open position. When the jaws are brought to the bottom of the well and contact therewith they will cause the lower section 1 to move upwardly on the upper section 2, thus bringing the dogs out of contacting engagement with the lower walls of the slots in the bars 25, releasing the dogs and permitting the same to be pocketed in the slot or opening 29. Such movement also causes the upper section to exert an upward pull on the bars 25, so that the jaws are thus brought to closed position and an article therebetween effectively gripped. The greater the upward pull upon the upper section 2, the tighter the jaws are brought into contacting engagement, and it is thought that the foregoing description, when taken in connection with the drawings will fully set forth the construction and advantages of the improvement without further detailed description.

The bars 25 are each constructed of two sections, having their confronting ends provided with oppositely pitched threads which are engaged by turn buckles 38. This permits of slack being taken up in the rods so that the slots 26 may be properly arranged to receive the dogs 31 therethrough. Also the upper bar sections have their flattened ends provided with any desired number of openings therethrough whereby the clips 27 may be arranged at varying adjustments on the section 2 and with respect to the bars 25.

Having described the invention, I claim:

1. In a fishing tool, slidably connected vertically supported shank sections, jaws pivotally secured to the lower section, means for holding the jaws open when the upper section is held by the suspending means outwardly with respect to the lower shank section, and means for releasing said holding means for causing the jaws to assume a closed position when either of the shank sections is moved toward the other shank section.

2. In a fishing tool, a vertically supported shank comprising two slidably connected sections, and means for limiting the sliding movement of one section on the other section, jaws carried by the lower section, means between the sections for holding the jaws in open position and the sections inward with respect to each other, releasable when the sections are moved toward each other, by the contact of the jaws with an obstacle for permitting the movement of the outer section away from the lower section and closing the jaws.

3. In a fishing tool, a flexibly supported shank susceptible to vertical movement in a well casing, said shank comprising slidably connected sections, jaws carried by the lower section, means associated with the lower section and connected with the upper section for operating the jaws to open position when the sections are moved a predetermined distance toward each other and for closing the jaws when the sections are moved away from each other, and spring influenced means carried by the lower section engaging said means for holding the jaws in open position.

4. In a fishing tool, a flexibly supported shank susceptible to vertical movement through a well casing, and comprising slidably associated sections, means limiting the sliding movement of the sections with respect to each other, jaws pivoted to the lower section, means pivotally associated with the said section designed when moved to one position to hold the jaws open and when moved to another position to close the jaws, said means including bars which are also connected to the upper section, spring influenced means carried by the lower section for engaging said bars for holding the same in one position to draw the upper section toward the lower section and sustain the jaws in open position, and said means designed to be released from the rod when pressure is exerted on the jaws, as when the same contacts with the bottom of the well to permit of the upper section moving outward from the lower section and drawing on the rods to close the jaws.

5. In a fishing tool, a flexibly supported shank susceptible to vertical movement through a well casing, said shank comprising slidably connected sections, means for limiting the sliding of the sections with respect to each other, jaws pivotally connected to the lower section, crossed links pivotally connected to the lower section and to the jaws, toggle levers pivotally connected to the links, slotted bars pivotally connected to the toggle levers and secured to the upper shank section, and spring influenced dogs carried by the lower shank section for engaging in the slots of the bars and for contacting with the lower walls thereof for normally holding the jaws in open position and the upper section moved inwardly on the lower section, and said bars designed to be released when the jaws are in contact with the bottom of the well and permitting the upper section being drawn away from the lower section and to also draw upon the bars to cause the latter to operate the toggle levers and links to bring the jaws to closed position.

6. In a fishing tool, a flexibly supported shank susceptible to vertical movement through a well casing and comprising slidably associated sections, means limiting the gravitating of the lower section away from the upper section, jaws pivoted to the lower section and means associated with said section designed when the upper section is lowered on the lower section to close the doors, said means including a plurality of crossed link connections between the jaws and lower section, other links connected to the crossed links, slotted bars adjustably supported on the upper section and pivotally connected to the last mentioned links, spring influenced pivoted dogs in the lower section received in the slots of the bar and held inactive against the pressure of their springs by the connection of the bars to the upper section, when said upper section is drawn away from the first mentioned section to normal position, and said bars comprising each a plurality of sections, and adjustable means connecting the sections.

In testimony whereof I affix my signature.

ANDREW A. MATHESON.